(12) United States Patent
Tshering et al.

(10) Patent No.: US 10,705,241 B2
(45) Date of Patent: Jul. 7, 2020

(54) DETERMINING SEA WATER RESISTIVITY

(71) Applicant: PGS Geophysical AS, Oslo (NO)

(72) Inventors: Tashi Tshering, Oslo (NO); Allan McKay, Borgen (NO); Johan Mattsson, Trångsund (SE); Kathrin Flisnes Bergh, Drammen (NO)

(73) Assignee: PGS Geophysical AS, Oslo (NO)

( * ) Notice: Subject to any disclaimer, the term of this patent is extended or adjusted under 35 U.S.C. 154(b) by 65 days.

(21) Appl. No.: 15/974,977

(22) Filed: May 9, 2018

(65) Prior Publication Data

US 2018/0329104 A1 Nov. 15, 2018

Related U.S. Application Data

(60) Provisional application No. 62/503,370, filed on May 9, 2017.

(51) Int. Cl.
*G01V 3/12* (2006.01)
*G01V 3/38* (2006.01)
*G01V 3/36* (2006.01)
*G01V 1/38* (2006.01)

(52) U.S. Cl.
CPC .............. *G01V 3/12* (2013.01); *G01V 1/3808* (2013.01); *G01V 3/36* (2013.01); *G01V 3/38* (2013.01)

(58) Field of Classification Search
CPC ...................................................... G01V 3/36
See application file for complete search history.

(56) References Cited

U.S. PATENT DOCUMENTS

2010/0179761 A1* 7/2010 Burtz .................. G01V 3/12
702/6
2012/0059585 A1* 3/2012 Kjerstad ............... G01V 3/12
702/6

OTHER PUBLICATIONS

Nordskag, Janniche et al., "Asymptotic airwave modeling for marine controlled-source electromagnetic surveying," Geophysics, vol. 72, No. 6 (Nov.-Dec. 2007); p. F249-F255, 11 Figs., 10.1190/1.2786025, 7 total pages.
Cruz Luz, Edelson et al., "Influence of Sea Water Resistivity on MCSEM Data," Revista Brasileira de Geofísica—Brazilian Journal of Geophysics, vol. 27(3), 2009, 8 total pages.

* cited by examiner

*Primary Examiner* — Jas A Sanghera
(74) *Attorney, Agent, or Firm* — Patterson & Sheridan, LLP

(57) ABSTRACT

Methods of geophysical prospecting are described herein. In the described methods, a data set of electromagnetic readings from a marine geophysical survey is obtained and loaded into a computer processing system. Using the computer processing system, a high-frequency subset of the data is selected based on a frequency threshold, and a seawater resistivity map is resolved from the subset for a seawater portion of the survey by inversion. The seawater resistivity map can subsequently be used to resolve a resistivity map of the seabed from the data set by inversion.

20 Claims, 7 Drawing Sheets

DETERMINING SEA WATER RESISTIVITY

CROSS-REFERENCE TO RELATED APPLICATIONS

This application claims priority to U.S. Provisional Patent Application Ser. No. 62/503,370 filed on May 9, 2017, which herein is incorporated by reference.

FIELD

This application is about methods of marine geophysical prospecting. More specifically, this application is about improved methods of electromagnetic inversion in geophysical prospecting.

BACKGROUND

Inversion of electromagnetic data is a process commonly used to identify geologic structures of interest for geophysical prospecting. A source of incident electromagnetic energy is typically towed in water behind a vessel, along with one or more receivers to detect response electromagnetic energy resulting from interaction of the incident electromagnetic energy with the earth, water, and air. The data thus gathered is compared to a geophysical model of the survey area. The known parameters, such as frequency, amplitude, and phase of the electromagnetic energy, and geometry of the survey, are used to model response electromagnetic energy, and the model result is compared to the measured data to determine geophysical parameters of the survey area. The geophysical parameter of most interest is usually electrical resistivity. A map of electrical resistivity is frequently drawn from the final electrical resistivity data, and the map can then be used to identify potential resource deposits for recovery.

In performing such inversions, it is typically not possible to fully invert for all depths from the sea surface into the subsurface. The wide range of resistivities encountered leads to problems of non-uniqueness and general difficulty in accurately converging the problem. For this reason, the resistivity of the seawater is typically pre-constrained. A common technique is to take a few independent resistivity measurements in the water, average them, and assume the seawater resistivity is constant. This approach reduces precision of the resulting subsurface resistivity map because seawater resistivity, in reality, can vary widely. In these situations, the recorded electromagnetic fields are not explained well by the models, and relatively large residual errors remain from the inversion, increasing uncertainty in interpreting the results.

Typical methods of dealing with the residues involve adjusting the assumed seawater resistivity and repeating the inversion. Such trial and error processes are time and resource intensive, and the quality of the result depends directly on the quality of the adjustments made to the seawater resistivity assumptions. Moreover, assuming constant seawater resistivity forces actual seawater resistivity variation into the data as unremovable noise.

There is a need for inversion methods that achieve better results using less time and computing resources.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered to limit the scope of any claimed inventions.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The amplitude and phase response of electromagnetic signals is less sensitive to resistivity at higher frequencies. Amplitude and phase of a propagating electromagnetic wave can be represented as follows:

$$A = A_0 e^{-r\sqrt{\frac{\sigma\omega\mu_0}{2}}}$$

$$\phi = \omega t - r\sqrt{\frac{\sigma\omega\mu_0}{2}}$$

where $\sigma$ is the conductivity of the medium, $\mu_0$ is vacuum permeability, and $\omega$ is angular frequency. As frequency increases, amplitude and phase response are attenuated by the skin depth effect. Skin depth is defined as the distance after which a plane wave is attenuated by $1/e$. Skin depth is approximated by $$\delta = k\sqrt{\frac{\rho}{f}}$$

where $\rho$ is electrical resistivity, f is field frequency, and k is about 503.29. Differentiating this relation with respect to frequency gives $$\frac{\partial \delta}{\partial f} = \frac{-k}{2f}\sqrt{\frac{\rho}{f}}$$

Indicating that skin depth declines as frequency increases, and the magnitude of the decline scales with $\sqrt{\rho}$. Thus, penetration of energy attenuates faster with increasing frequency and decreasing resistivity.

Figure 1:
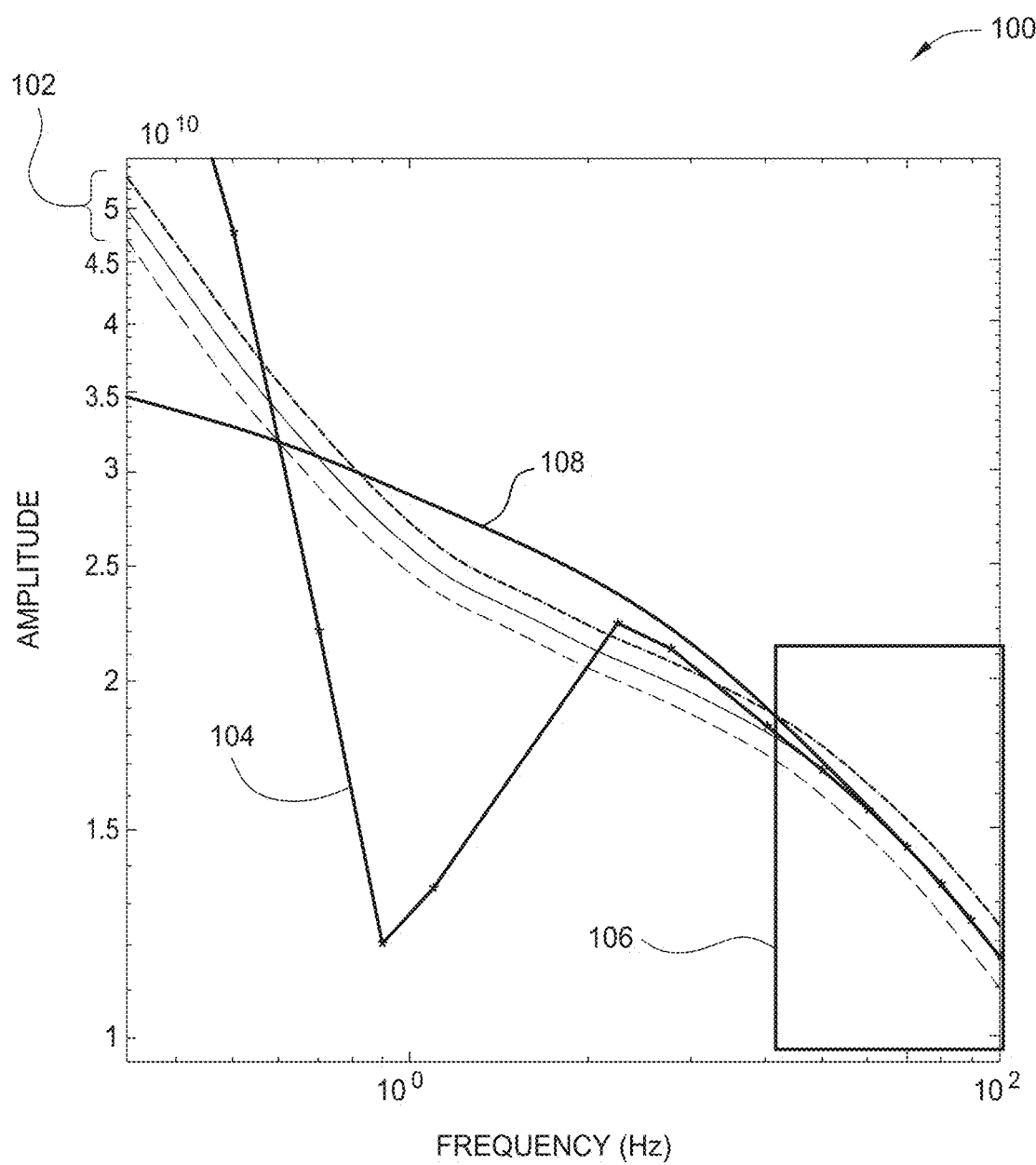
FIG. 1 is a graph of amplitude response as a function of frequency for a modeled air-water system and an air-water-sediment system.

The inventors have found that this fact can be used to determine seawater resistivity from high frequency electromagnetic survey data meeting certain criteria. Rocks generally have higher electromagnetic resistivity than seawater, so high frequency responses are mainly dominated by seawater resistivity. FIG. 1 is a graph 100 of amplitude response as a function of frequency for two modeled cases. At 102 is an air-water only model after Nordskag and Amundsen (Asymptotic airwave modeling for marine controlled-source electromagnetic surveying, *Geophysics* 72(6), pp. F249-F255, 2007). At 108 is the same model including effects of the seabed. At 104 is a full numerical model of the system, including the seabed. As can be seen at rectangle 106, the curves converge at high frequencies. It is believed that the skin depth effect causes the lower conductivity sediment layer to attenuate electromagnetic energy at frequencies that penetrate the more conductive seawater layer. In any event, because the effect of the sediment layer is attenuated at higher frequencies, the receiver response at higher frequencies is due mainly to the properties of the seawater layer. By selecting data from an electromagnetic survey that depend mostly on seawater properties, an inversion on this subset can yield a seawater resistivity map suitable to the particular geophysical survey. Having a reasonably accurate map of seawater resistivity experienced during the survey can produce an overall inversion with lower irreducible residues in less time using less computing resources than inversions performed using conventional methods, since the seawater resistivity map more accurately reflects the actual fields recorded by the receivers.

In FIG. 1, there are three curves 102 representing results of the air-water only model at three different water resistivity values. One of the three values gives a curve that lies very close to the full numeric model data at high frequencies, while the other two lie to either side. This shows that the analytic model can be used to find a resistivity value that most closely tracks electric field measurements made by electromagnetic receivers.

Figure 2:
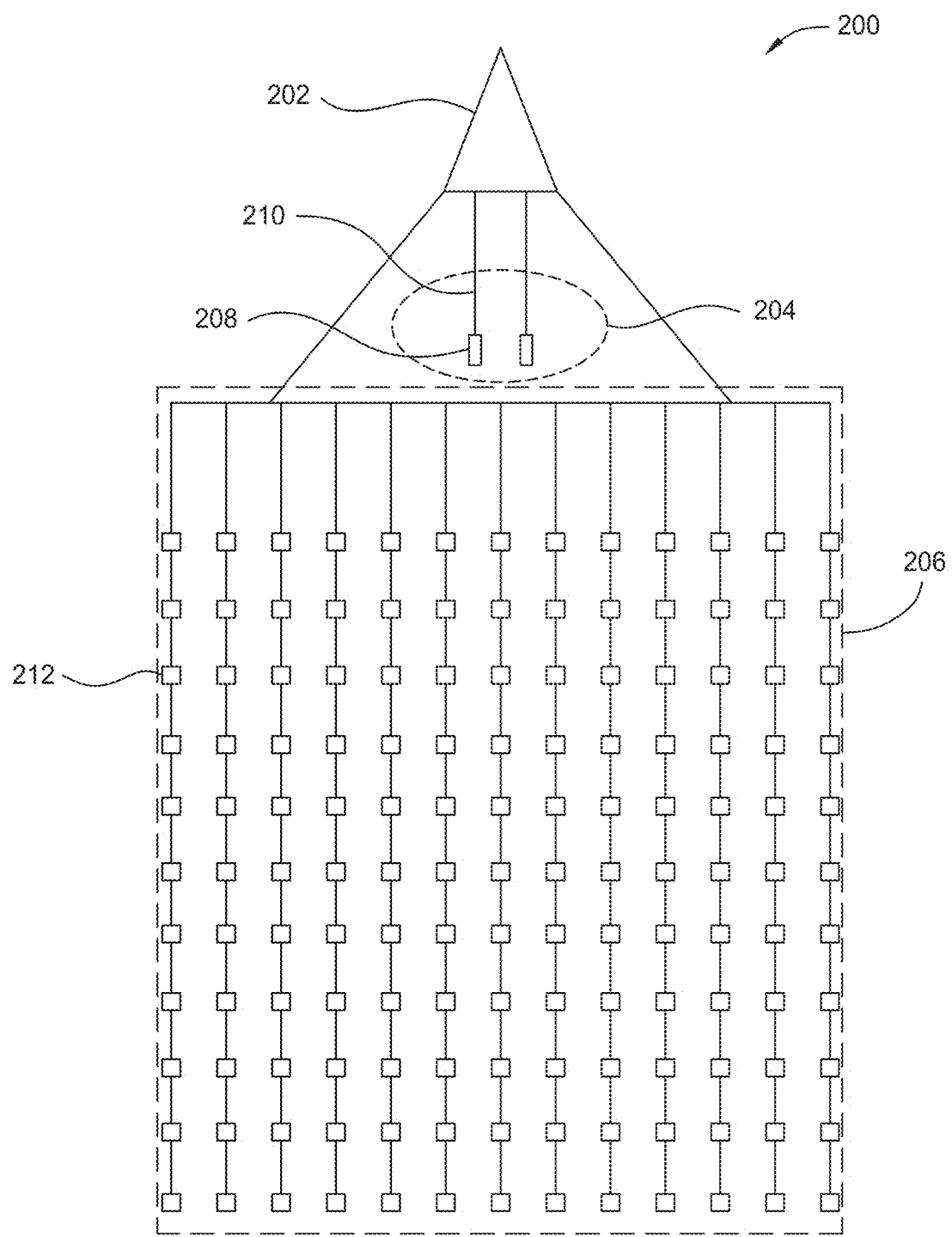
FIG. 2 is an activity diagram showing a typical marine electromagnetic (EM) survey configuration useful for practicing embodiments disclosed herein.

FIG. 2 is an activity diagram showing a typical marine electromagnetic (EM) survey configuration 200. A vessel 202 tows an electromagnetic ("EM") source assembly 204 and an EM receiver assembly 206 at specified depths and distance relationships. The source assembly 204 typically includes one or more sources of EM radiation 208, for example a capacitance and/or inductance connected to a source of electric power, which may be any combination of A/C and D/C power, along a tow line 210. The source of electric power is typically on the vessel 202. Each EM source 204 is typically independently operable over a range of frequencies and amplitudes useful for geophysical surveying. The receiver assembly 206 typically includes a plurality of receivers 212, for example electric dipoles and/or loops, to sample voltages, currents, and magnetic fields at various distances from the source assembly 204. In other configurations, one or more of the sources 208 and the receivers 212 may be stationary, located on the seabed or in mid-water at a fixed location.

The sources 208 are commonly powered at a plurality of frequencies, and the resulting electromagnetic readings taken by the receivers 212 constitute a "shot." Shots may be performed at different locations and times, with different source/receiver geometries (spacing/offset/depth/velocity), and the sampling by each receiver for one shot is usually performed over a period of time to register the frequency, amplitude, and phase response of the environment to various patterns of electromagnetic stimulus. The data thus obtained can then be analyzed, as described above, using inversion methods to resolve a resistivity map of the subsurface.

The inversion process uses an electromagnetic model of the surveyed region, with a model of the electromagnetic sources and receivers and the stimulus pattern, to predict the electromagnetic response measured by the receivers. Properties, mainly electromagnetic resistivity, of the surveyed region are initialized, model results compared to the actual recorded response, and the properties are adjusted based on error in the response predicted by the model. When the error is sufficiently small, or sufficiently unchanging, the inversion is complete, and the final estimate of properties is regarded as a representation of the actual properties of the surveyed region. Such properties can then be used to search for and find portions of the seabed that appear to have the properties of valuable resources such as hydrocarbon.

Processing inversions is typically very demanding on computer resources. Direct, brute-force, inversion of the entire system is usually prohibitive and in many cases non-convergent, so certain simplifying measures are frequently taken. This application describes a new way of making such simplifications that makes better use of computing resources to achieve a more accurate result in less time. The most common simplification applied to inversion problems is to determine electromagnetic properties of relatively homogeneous parts of the surveyed area that are substantially distinct from other relatively homogeneous parts of the surveyed area. Usually, properties of the non-solid parts of the surveyed area, seawater and air, are determined separately and then initialized in the inversion model as constants.

This application describes a new way of resolving seawater resistivity prior to full domain inversion. This new method solves problems that arise in conventional methods of estimating seawater resistivity. In conventional inversions, seawater resistivity is determined by separate conductivity tests done at different times, under different environmental conditions, and using different test procedures. A few readings are typically taken, and an average of the readings is applied across the surveyed area. In such cases, the seawater and air resistivities determined are not exactly the same as the resistivities at the time of the main geophysical survey, and the applied average does not reflect variation in seawater resistivity, leading to reduced accuracy of the inversion. In other cases, sparse inversion of the survey is performed to initialize seawater resistivity as constant, and then the full inversion is performed. Such inversions have poor accuracy in resolving seawater resistivity.

Figure 3:
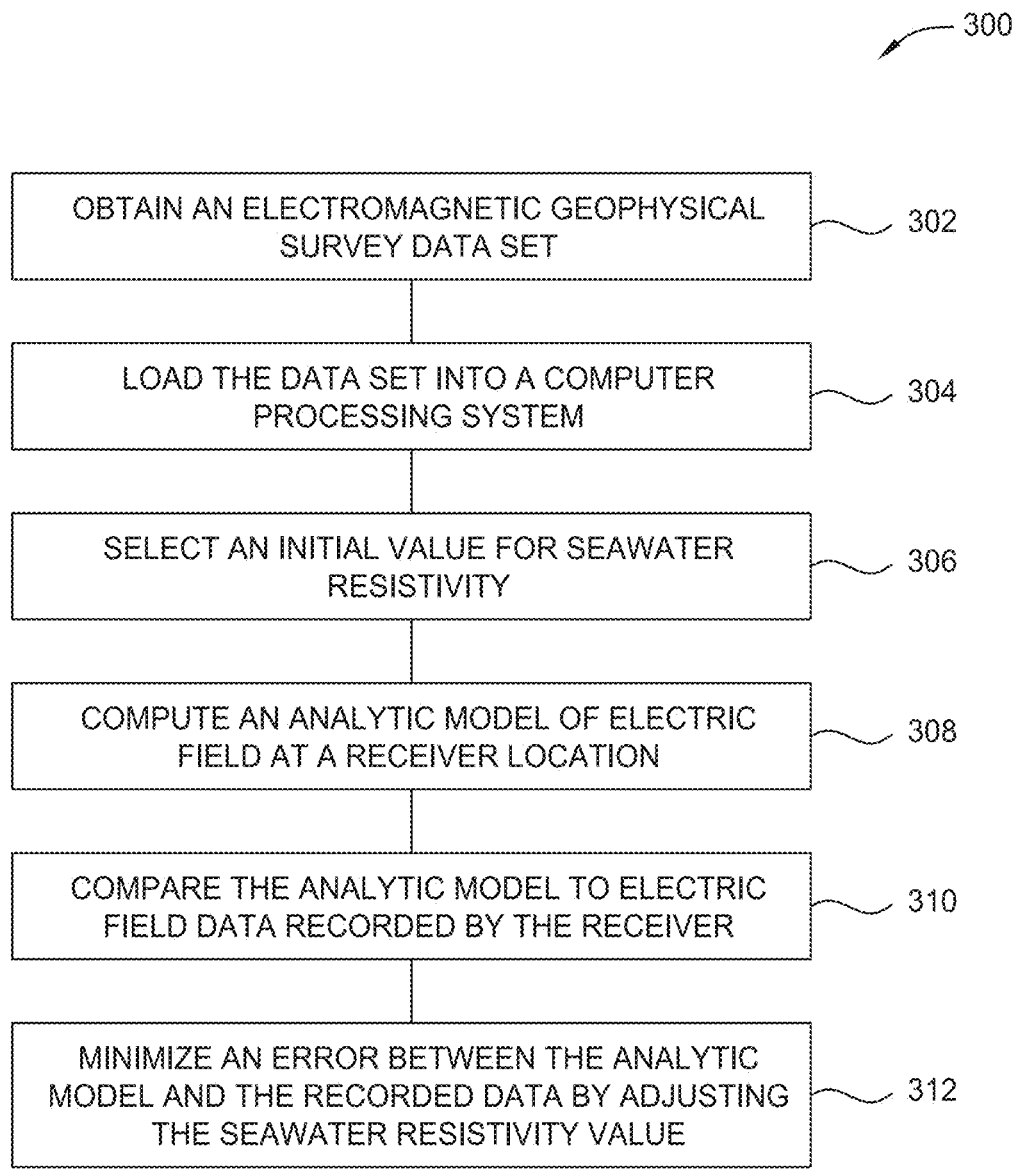
FIG. 3 is a flow diagram summarizing a method of determining seawater resistivity according to one embodiment.

FIG. 3 is a flow diagram summarizing a method 300 of determining seawater resistivity according to one embodiment. At 302, an electromagnetic survey data set is obtained. The electromagnetic survey data set is generally a set of electromagnetic readings from an array of electromagnetic receivers deployed according to a known pattern and motion paradigm in relation to an array of electromagnetic sources, also deployed according to a known pattern and motion paradigm and operated according to a known procedure, for example as shown in FIG. 2. The data set is loaded into a computer processing system at 304 for inversion processing. An inversion process is performed encompassing operations 306, 308, and 310 to resolve a value for seawater resistivity that matches the recorded data.

At 306, an initial value for seawater resistivity is selected. At 308, the seawater resistivity value is used to compute a model of electric field in the seawater at the location of a receiver that recorded data in the data set. The source-receiver offset is known, as are the source frequencies, amplitudes, and other shot parameters. The model may be the simple analytic model of a TE plane wave emanating from a horizontal electric dipole driven at a frequency ω described in Nordskag and Amundsen, which finds that the electric field amplitude measured by a receiver at depth $z_r$ and offset r emanating from a source at depth $z_s$ in a water volume of total depth $z_b$ is given by $$E_r = \left[ \frac{p \cos\phi e^{ik(z_r+z_s)} e^{ik_0 r}}{2\pi\sigma_1 r^3} \right] \left[ \frac{1 + \left(\frac{\sigma_1 - \sigma_2}{\sigma_1 + \sigma_2}\right) e^{2ik(z_b-z_s)}}{1 - \left(\frac{\sigma_1 - \sigma_2}{\sigma_1 + \sigma_2}\right) e^{2ikz_b}} \right] \quad (1)$$

$$\left[ \frac{1 + \left(\frac{\sigma_1 - \sigma_2}{\sigma_1 + \sigma_2}\right) e^{2ik(z_b-z_r)}}{1 - \left(\frac{\sigma_1 - \sigma_2}{\sigma_1 + \sigma_2}\right) e^{2ikz_b}} \right]$$

where ρ is the source dipole moment (for a horizontal electric dipole), Ø is the azimuth angle of the source, $k=\sqrt{i\omega\mu_0\sigma_1}$ is the complex wavenumber for seawater with conductivity $\sigma_1$, $\sigma_2$ is the seabed conductivity at depth $z_b$, $k_0=\sqrt{\omega\mu_0\varepsilon_0}\approx 0$ m$^{-1}$ is the wavenumber in air, ω is the circular frequency, $\mu_0$ is the magnetic permeability in vacuum, and $\varepsilon_b$ is the electric permittivity in vacuum. Here, because we use data that has substantially no contribution from seabed effects, $\sigma_2$ can be assumed to vanish, so that equation (1) reduces to $$E_r = A \frac{e^{ik_0 r}}{\sigma_1 r^3} \quad (2)$$

where A is constant for a given shot/receiver geometry and known frequency and does not depend on seabed conductivity. Where seawater conductivity is assumed to vary with depth, each instance of kz in the equations above can be replaced with $\int_0^z kz' dz'$, which can be represented analytically for an analytic model of conductivity variation with depth (such as a linear model) or may be computed numerically. The model is computed for the different frequencies in the database, and the resultant model amplitudes resolved for the receiver location.

At 310, the amplitudes of the analytic model are compared to the amplitudes recorded by the receiver at the different frequencies. At 312, an error minimization is performed in which the seawater resistivity value is varied to minimize the error between the amplitudes of the analytic model and the recorded amplitudes.

A frequency threshold is selected for the error minimization. As can be seen in FIG. 1, and as explained in connection therewith, an accurate model of electric field in seawater will track real measurements at high frequencies. Thus, a frequency threshold is selected, and recorded data at or above the frequency threshold is compared to the analytic model for error minimization. The frequency threshold is selected at which the analytic model without seabed effects (Curve 108 of FIG. 1, from Equation 2) converges with the analytic model with seabed effects (curve 102 of FIG. 1, from Equation 1), typically with an error less than about 10%. For purposes of selecting the frequency threshold, estimates of seawater and seabed resistivity can be used. Generally, the higher the frequency threshold, the more accurate the final seawater resistivity result. So, for example, the frequency threshold may be determined for an error less than about 5% or about 3%.

The above process resolves a single value for seawater resistivity. To take into account variation of seawater resistivity with depth, the Nordskag-Amundsen equation can be used with the product of depth and square-root of conductivity integrated to the source, receiver, and seabed depths, respectively, as described above. The seawater volume can be modeled as layers, and seawater resistivity estimates can be initialized for all the layers. The error minimization can adjust the individual resistivity estimates to minimize the error. If desired, a model of resistivity with depth can be enforced such that changes to individual estimates of resistivity change all the estimates, as required by the model. For example, a linear model of resistivity with depth can be maintained as the resistivity estimates are adjusted.

The process above resolves resistivity for a seawater portion of a marine electromagnetic survey. Using the process above, either a single value for seawater resistivity across the survey volume, or a layered map of seawater resistivity over the volume, is resolved. The resolved estimates of seawater resistivity are compatible with the recorded data that will be used for full domain inversion, reducing complexity of converging the inversion. Because the resolved seawater resistivities match the conditions recorded by the receivers during the survey, the resolved seawater resistivities provide the best resolution of effects of seawater resistivity on energy emanating from the sea floor. The method 300 is useful in improving the results of inversions in electromagnetic geophysical prospecting. Inversion problems that previously would not satisfactorily converge due to lack of sufficient specification, for example, may benefit from the approach of method 300 through improved estimation of seawater resistivity leading to lower residues and faster convergence.

Figure 4:
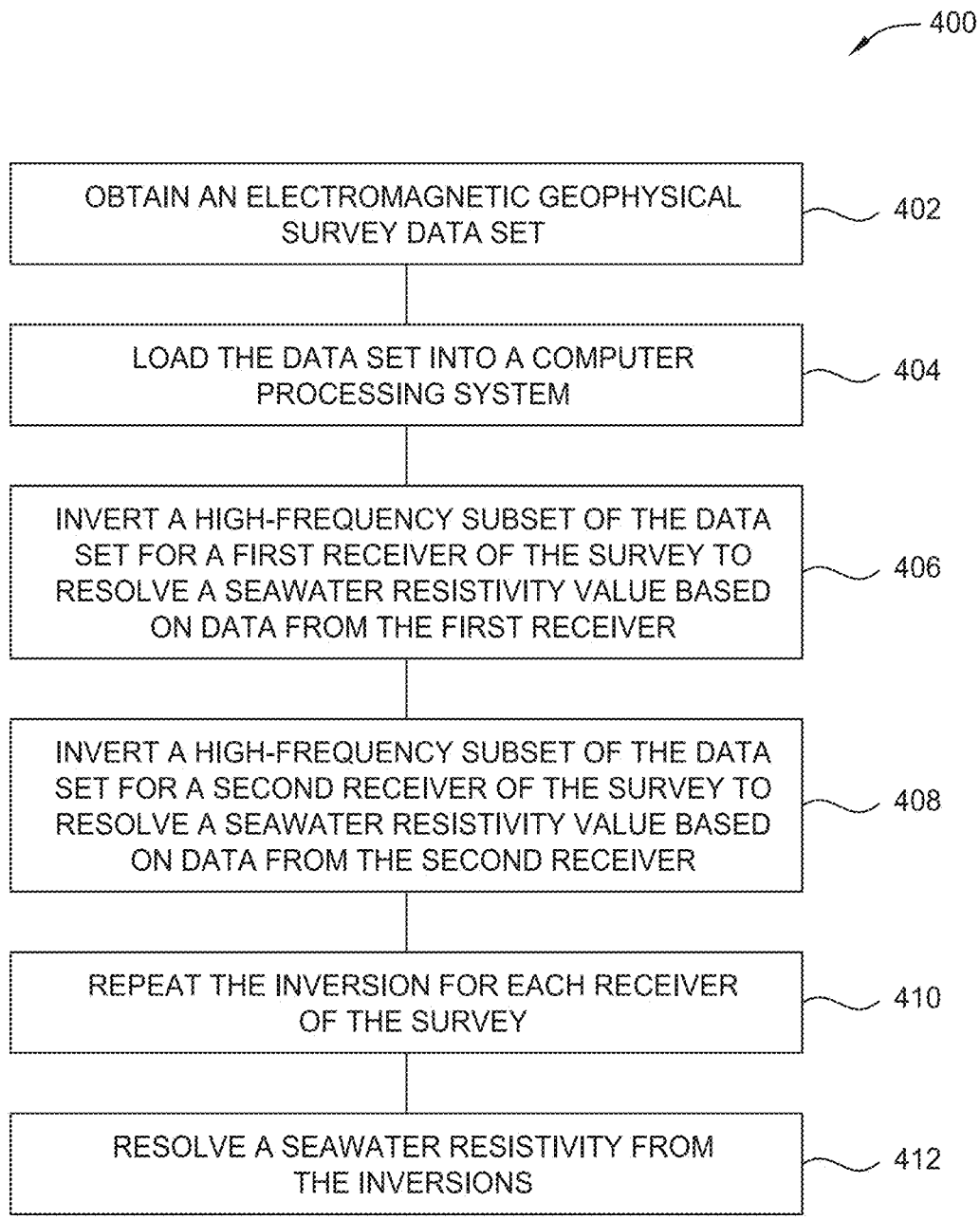
FIG. 4 is a flow diagram summarizing a method according to another embodiment.

FIG. 4 is a flow diagram summarizing a method 400 according to another embodiment. The method 400 is similar to the method 300 in some respects, but differs in that multiple inversions are performed for seawater resistivity based on different subset selections from the initial data set to find the best resolution for seawater resistivity. At 402 and 404, an electromagnetic geophysical survey data set Is obtained and loaded into a computer processing system.

At 406, a high-frequency subset of the data set for a first receiver of the survey is inverted to resolve a seawater resistivity value based on data from the first receiver. The method 300 of FIG. 3 can be used to resolve the seawater resistivity value based on data from the first receiver. As noted above, a single value can be resolved or a layered map can be resolved. As above, the frequency parameter may be source frequency, receiver frequency, or a parameter that depends at least partially on frequency, such as amplitude or phase modulation. A parameter that represents a combination of frequency, amplitude modulation, phase modulation, shot location, offset, and/or other properties may be used.

At 408, a high-frequency subset of the data set for a second receiver of the survey is inverted to resolve a seawater resistivity value based on data from the second receiver. The method 300 of FIG. 3 can also be used here to resolve the seawater resistivity value based on the data from the second receiver. As above, a single value or a layered map of resistivity can be resolved.

The first receiver and the second receiver are typically located at different offsets from the source, so the distance of water across which the readings are taken will be different and the amplitude profiles recorded by the two receivers will be different. Thus, the frequency threshold for identifying the high-frequency subset of the data will be different for the two receivers. For example, if the second receiver has a larger offset than the first receiver, the electric field data recorded by the second receiver will show effects of the seabed resistivity at higher frequencies than the electric field data recorded by the first receiver.

Seawater resistivity inversion described herein, based on high frequency response data, can be performed over a range of offsets beyond which the seawater dominance cannot be relied upon. This range can be determined by comparing the curves of Equations 1 and 2 at various offsets. Signal-to-noise ratio declines in high frequencies with increasing offset, making use of the high frequency data less reliable at longer offsets. The maximum offset will be influenced by seabed depth, and can be determined by comparing the curves of Equations 1 and 2 at a value of $z_b$ representing the minimum bathymetry in the survey. An estimate of seabed resistivity can be obtained from other sources, such as nearby well logs, and convergence of Equations 1 and 2 can be checked as a function of offset. The maximum offset determined using the minimum bathymetry can be confirmed by repeating the above analysis using the maximum bathymetry of the survey.

At 410, the inversion is repeated for each receiver in the survey where offset is no more than the maximum offset determined above. It should be noted that the source may be used to produce multiple shots, potentially at different locations in the survey area. The data from each shot can be processed according to the method 400 to yield multiple resistivity values for each receiver. In each case, a single value of resistivity, or a layered map of resistivity, can be resolved. In cases where multiple sources are used, the above analysis can be repeated for each shot/receiver pair in the survey having offset within the maximum offset determined above.

At 412, a final seawater resistivity is resolved from the inversions. In one aspect, all the resolved resistivity values can be averaged to yield a single value for the entire seawater volume of the survey. If layered resistivity maps are resolved from the individual inversions, the values for corresponding layers can be averaged to resolve a single layered map for the entire seawater volume of the survey. Resolving seawater resistivity in this way produces an accurate estimate of resistivity based on the data recorded by the receivers, thus reducing errors from incompatible estimates of seawater resistivity, and processing to overcome those errors.

Figure 5:
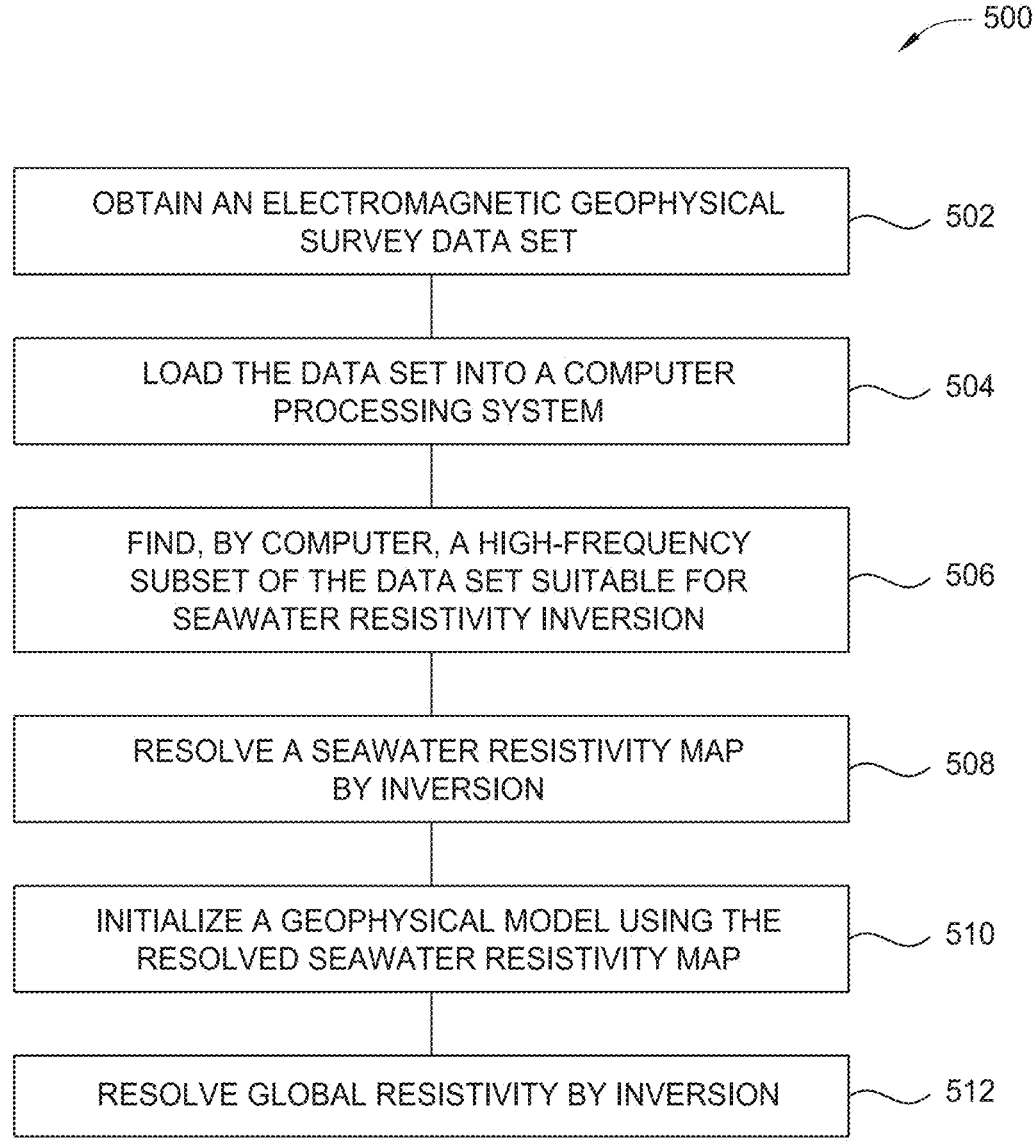
FIG. 5 is a flow diagram summarizing a method according to another embodiment.

FIG. 5 is a flow diagram summarizing a method 500 according to another embodiment. At 502 an electromagnetic geophysical survey data set is obtained. As noted above, the data set may be obtained by conducting a geophysical survey using a configuration similar to that shown in FIG. 2, or another applicable configuration. Alternately, an existing data set representing a geophysical survey conducted in the past may be obtained.

At 504, the data set is loaded into a computer processing system. At 506, the computer processing system is used to select a high-frequency subset of the data set that is suitable for seawater resistivity inversion. The suitable subset is selected based on a frequency at which an effect of electromagnetic properties of the seabed on the readings captured by the receivers is small or negligible. Suitable data may also exhibit amplitude and phase modulation that is independent of shot location, and may also exhibit phase modulation that is independent of receiver location. The frequency parameter may be predetermined, or may be defined by the computer processing system by manipulation of the data set. For example, the data set may be transformed to a frequency domain using a standard transformation, and a region of the data set may be found where amplitude attenuation with frequency is approximately linear. A frequency threshold may be selected by forward modelling all frequencies in the data set and comparing computed amplitudes with measured amplitudes to find data where the modelled amplitude error is less than a predetermined threshold, such as 10%, 5%, or 3%. Using lower error thresholds drives the frequency threshold higher.

At 508, a seawater resistivity map is resolved by inversion. As noted above, the process of selecting the subset and inverting for seawater resistivity can be performed for each receiver in the survey and for each shot/receiver pairing of the survey. As also noted above the Nordskag-Amundsen equation can be used for simple inversion. Alternately, a numerical solution of Maxwell's equations can be performed for the seawater volume only.

At 510, the seawater resistivity map resolved at 508 is used to initialize a geophysical model for full inversion of the original data set. Other resistivities in the model may be initialized using any suitable a priori information, such as seismic survey data. For the global inversion, a cellular structure is defined for the survey volume for processing. The seawater resistivities resolved at 508 are initialized in the sea volume cells. If a constant seawater resistivity is assumed, each seawater volume cell will be initialized with the same resistivity value. If a seawater resistivity map is resolved, the map can be parsed into the cells by simple discretization, such that the map of seawater resistivity is discretized according to the cellular structure.

At 512, global resistivities of the entire survey are resolved by inversion, holding the seawater resistivities determined at 508 constant. The resulting resistivity map of the seabed can then be used to represent geologic structures of interest for further exploration.

Figure 6:
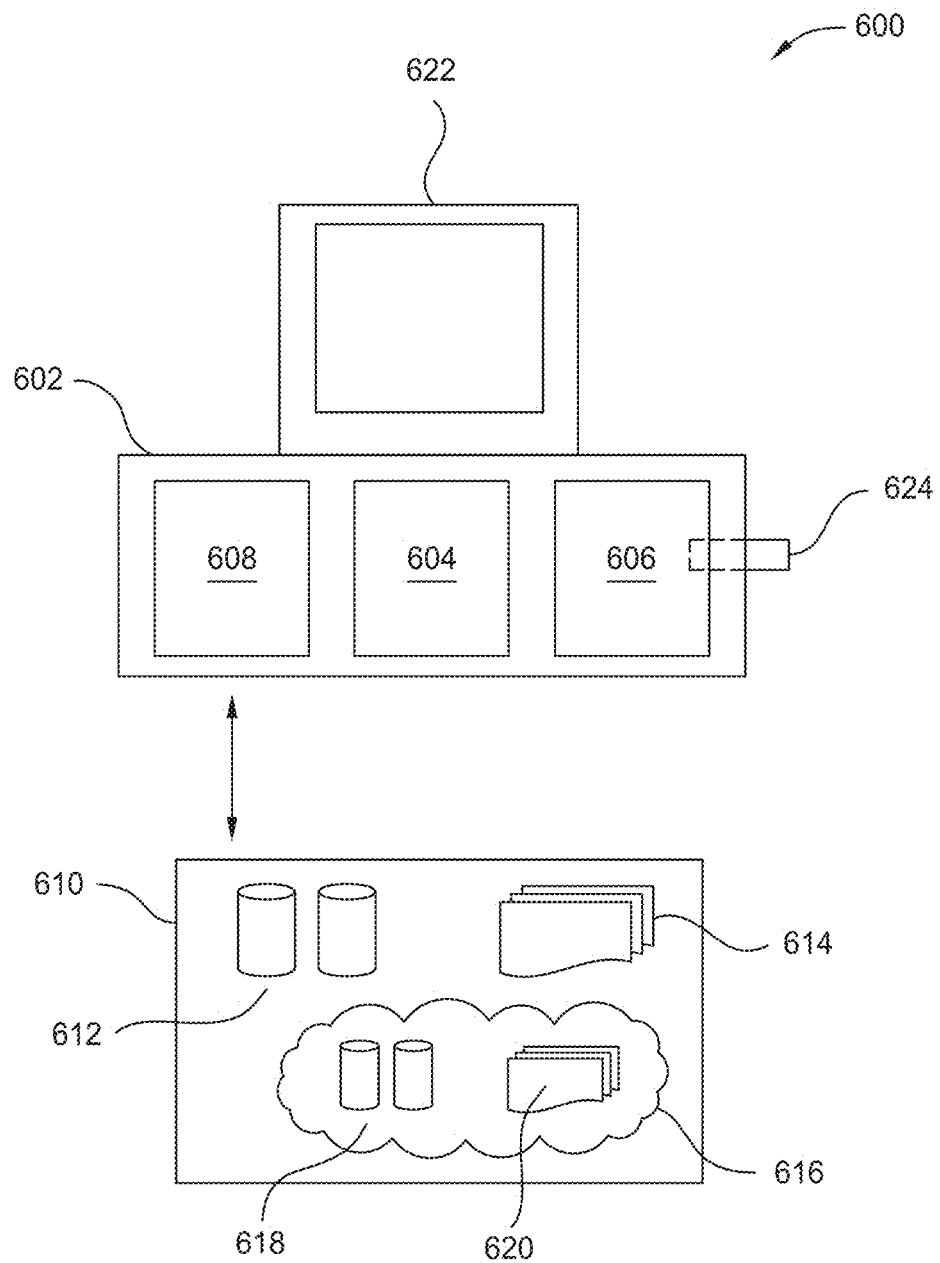
FIG. 6 is a diagram of a computer processing system featuring a data product according to another embodiment.

FIG. 6 is a diagram of a computer processing system 600 featuring a data product according to another embodiment. The computer processing system 600 features a processing unit 602, which comprises a processor 604, a storage 606, and a communication module 608. The storage 606 may be solid state or moving storage, and may be located inside the processing unit 602, as shown in FIG. 6, or outside the processing unit 602. The communication module 608 may be a modem of any convenient type.

The communication module 608 communicates with a network 610, which may include any or all of: 1) network processing units 612, 2) network storage units 614, and 3) a cloud computing system 616. The cloud computing system 616 may also include cloud processors 618 and cloud storage 620. The network 610 may be used for processing by the network processing units 612 and/or the cloud processors 618. The network 610 may also, or instead, be used for storage by the network storage units 614 and/or the cloud storage 620.

The computer processing system 600 also features an optional readout 622, which may be a video system or a print system. A portable storage medium 624 can be used to store data from the storage 606 in a portable manner. The portable storage medium is a tangible storage medium that stores data magnetically or optically. For example a disk, flash drive, optical disk, or other non-transitory computer-readable medium can be interfaced with the storage 606 to store data on the computer readable medium.

A data product created using any of the methods herein, or any part of a method described herein, can be stored on the portable storage medium 624. The data product may be a data representation of the global resistivity map resolved in the method 500. The data product may be a data representation of the seawater resistivity maps resolved in operations 508, 408, 412, or 310. The data product may be a data representation of any of the inversion models used herein, at any stage of convergence. The data product may be a data representation of any of the errors, or error maps, yielded by any of the inversions used herein, at any stage of convergence. In most cases, the data product will be a geologic representation created by treating the global resistivity map of the method 500 to improve geophysical interpretation of the global resistivity map.

It should be noted that the computer processing system 600 may be located on the vessel 202 of FIG. 2, or in another location. When the computer processing system 600 is located on the vessel 202, all processing can be done by the processor 604 in communication with the storage 606, and the communication module 608 can communicate any desired data via the network to the network storage 614 or to the cloud storage 620, where the data can be loaded onto a portable storage medium such as the portable storage medium 624. Alternately, the computer processing system 600 can be located elsewhere, and may communicate with the vessel 202 over the network using the communication module 608 to receive geophysical readings from the vessel 202 to assemble into a data set for processing by any of the methods described herein.

Figure 7:
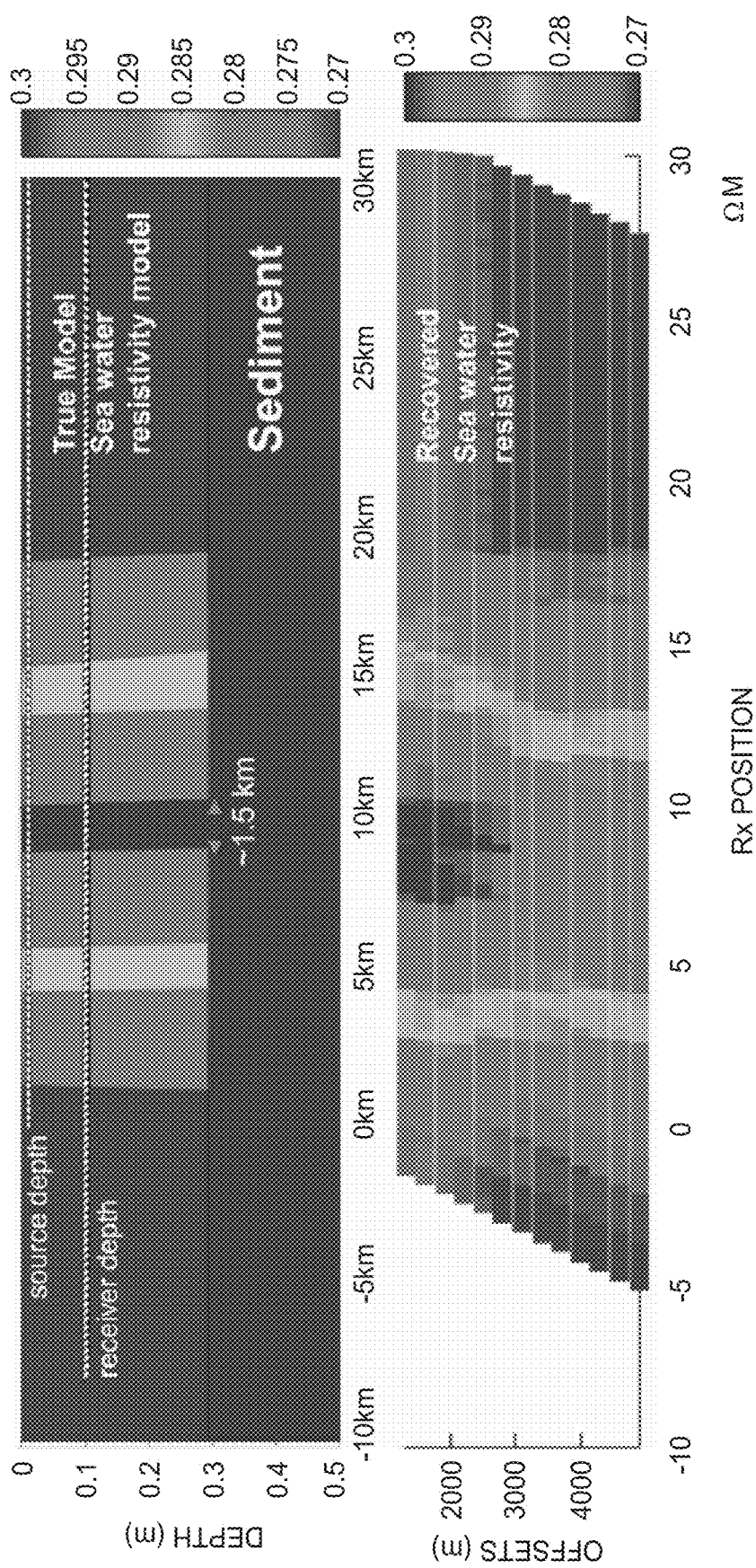
FIG. 7 is a chart showing an example in which seawater resistivity is resolved from geophysical data according to the methods described herein.

FIG. 7 is a chart showing an example in which seawater resistivity is resolved from geophysical data according to the methods described herein. The data is synthetic, and is based on a model of seawater resistivity used for demonstration purposes. The top plot shows the true model, with resistivity variations on the scale of about 1.5 km, and the lower plot shows the inverted model. Here, the correlation between the true model and the inverted model shows that this inversion can be used to invert for high resolution water resistivity coverage using higher frequencies and the analytical solutions for the air-water response.

The methods described herein represent an improvement in the way electromagnetic resistivity of geologic formations is determined. In a geophysical prospecting method featuring inversion of a data set containing electromagnetic readings taken from a survey area to resolve electromagnetic resistivities of structures in the survey area, the methods described herein can be applied to initialize seawater resistivities at values compatible with the readings in the data set before performing the global inversion. The problem of indistinctness exhibited in conventional processes due to imprecise assumptions about seawater resistivity is overcome in these methods by resolving a map of seawater resistivities from the electromagnetic readings. This avoids introducing error into the inversion problem from incompatible assumptions about seawater resistivity.

While the foregoing is directed to embodiments of the present invention, other and further embodiments of the present disclosure may be devised without departing from the basic scope thereof, and the scope thereof is determined by the claims that follow.

What is claimed is:

1. A method of geophysical prospecting, comprising:
   selecting a high-frequency subset from a data set of electromagnetic readings from a marine geophysical survey of a survey volume, the high-frequency subset including data having frequencies above a frequency threshold, the selecting comprising:
   generating a first model for the data set that comprises an air-water model;
   generating a second model for the data set that comprises the first model and includes effects of a seabed portion of the survey volume; and
   identifying the frequency threshold as a frequency above which the first model and the second model converge;
   inverting the high-frequency subset to resolve a resistivity map for a seawater portion of the marine geophysical survey; and
   storing the resistivity map for the seawater portion in a storage.

2. The method of claim 1, further comprising:
   using the resistivity map for the seawater portion to initialize an inversion model of the marine geophysical survey;
   resolving a resistivity map for the seabed portion of the survey volume from the initialized inversion model and the data set using an inversion process; and
   saving the resistivity map for the seabed portion in the storage.

3. The method of claim 1, wherein the high-frequency subset is selected for one shot/receiver pair of the geophysical survey, the resistivity map for the seawater portion is resolved for the shot/receiver pair, and the method is repeated for each shot/receiver pair in the geophysical survey.

4. The method of claim 1, wherein the high-frequency subset also has amplitude and phase response independent of shot location and phase response independent of offset.

5. The method of claim 1, wherein resolving the resistivity map for the seawater portion of the marine geophysical survey comprises initializing resistivities of the seawater portion in layers with values that vary with depth.

6. The method of claim 1, wherein selecting the high-frequency subset further comprises transforming the data set to a frequency domain having a frequency component and comparing the frequency component to the frequency threshold.

7. A method of marine geophysical prospecting, comprising:
   obtaining a data set of electromagnetic readings from a marine geophysical survey of a survey volume;
   selecting a high-frequency subset from the data set based on a frequency threshold, the selecting comprising:
   generating a first model for the data set that comprises an air-water model;
   generating a second model for the data set that comprises the first model and includes effects of a seabed portion of the survey volume; and
   identifying the frequency threshold as a frequency above which the first model and the second model converge;
   inverting the high-frequency subset to resolve a resistivity map for a seawater portion of the survey volume;
   saving the resistivity map for the seawater portion in a storage;
   using the resistivity map for the seawater portion to initialize an inversion model; and
   resolving a resistivity map for the seabed portion of the survey volume from the initialized inversion model and the data set using an inversion process; and
   saving the resistivity map for the seabed portion in the storage.

8. The method of claim 7, wherein the high-frequency subset is selected for one shot/receiver pair of the geophysical survey, the resistivity map for the seawater portion is resolved for the shot/receiver pair, and resolving the resistivity map for the seawater portion is repeated for each shot/receiver pair in the geophysical survey.

9. The method of claim 7, wherein the high-frequency subset also has amplitude and phase response independent of shot location and phase response independent of offset.

10. The method of claim 7, wherein resolving the resistivity map for the seawater portion of the survey volume comprises initializing resistivities of the seawater portion in layers with values that decrease with depth.

11. The method of claim 7, wherein selecting the high-frequency subset further comprises transforming the data set to a frequency domain having a frequency component and comparing the frequency component to the frequency threshold.

12. The method of claim 7, further comprising inverting the resistivity map for the seabed portion to search for resources in the seabed portion.

13. An improvement of a method of geophysical prospecting that includes obtaining an electromagnetic geophysical survey data set of a survey volume with a geophysical survey, loading the data set into a computer processing system, and resolving, by global inversion, resistivities of a seabed portion of the survey volume, the improvement comprising:
    using the computer processing system to perform a process of:
        selecting a high-frequency subset of the data set based on a frequency threshold, the selecting comprising:
            generating a first model for the data set that comprises an air-water model;
            generating a second model for the data set that comprises the first model and includes effects of the seabed portion of the survey volume; and
            identifying the frequency threshold as a frequency above which the first model and the second model converge;
        inverting the high-frequency subset to determine seawater resistivity to resolve a map of seawater resistivity from the inversion; and
        using the map of seawater resistivity to initialize the global inversion.

14. The improvement of the method of claim 13, wherein:
    the high-frequency subset is selected for one shot/receiver pair of the geophysical survey,
    the map of seawater resistivity is resolved for the shot/receiver pair, and
    resolving the map of seawater resistivity is repeated for each shot/receiver pair in the geophysical survey.

15. The improvement of the method of claim 13, wherein the high-frequency subset also has amplitude and phase response independent of shot location and phase response independent of offset.

16. The improvement of the method of claim 13, wherein resolving the map of seawater resistivity of the survey volume comprises initializing resistivities of a seawater portion of the survey volume in layers with values that decrease with depth.

17. The improvement of the method of claim 13, wherein selecting the high-frequency subset further comprises transforming the data set to a frequency domain having a frequency component and comparing the frequency component to the frequency threshold.

18. The improvement of the method of claim 13, wherein using the map of seawater resistivity to initialize the global inversion comprises defining a cellular structure of the survey volume and discretizing the map of seawater resistivity according to the cellular structure.

19. A non-transitory computer-readable medium containing a physical or magnetic pattern representing a data set depicting geologic features of a seabed volume made by a process, comprising:
    obtaining a data set of electromagnetic readings from a marine geophysical survey of a survey volume including the seabed volume;
    loading the data set into a computer processing system; and
    using the computer processing system to perform a computing process of:
        selecting a high-frequency subset from the data set based on a frequency threshold, the selecting comprising:
            generating a first model for the data set that comprises an air-water model; 'generating a second model for the data set that comprises the first model and includes effects of the seabed volume; and
            identifying the frequency threshold as a frequency above which the first model and the second model converge;
        inverting the high-frequency subset to resolve a resistivity map for a seawater portion of the survey volume;
        using the resistivity map for the seawater portion to initialize an inversion model; and
        resolving a resistivity map for the seabed volume from the initialized inversion model and the data set using an inversion process.

20. The non-transitory computer-readable medium of claim 19, wherein using the resistivity map for the seawater portion to initialize an inversion model comprises defining a cellular structure of the survey volume and discretizing the resistivity map for the seawater portion according to the cellular structure.

* * * * *

UNITED STATES PATENT AND TRADEMARK OFFICE
CERTIFICATE OF CORRECTION

PATENT NO. : 10,705,241 B2
APPLICATION NO. : 15/974977
DATED : July 7, 2020
INVENTOR(S) : Tashi Tshering et al.

It is certified that error appears in the above-identified patent and that said Letters Patent is hereby corrected as shown below:

In the Claims

At Column 12, Line number 32, please remove the """ and insert a line break

Signed and Sealed this
Eleventh Day of August, 2020

Andrei Iancu
*Director of the United States Patent and Trademark Office*